United States Patent [19]

Choffat

[11] 4,435,986

[45] Mar. 13, 1984

[54] PRESSURE TRANSDUCER OF THE VIBRATING ELEMENT TYPE

[75] Inventor: Hubert Choffat, Bole, Switzerland

[73] Assignee: Centre Electronique Horloger S.A., Neuchatel, Switzerland

[21] Appl. No.: 319,286

[22] Filed: Nov. 9, 1981

[30] Foreign Application Priority Data

Nov. 12, 1980 [CH] Switzerland .................. 8387/80

[51] Int. Cl.³ ............................................. G01L 9/08
[52] U.S. Cl. .................................................... 73/702
[58] Field of Search ............ 73/702, DIG. 4, DIG. 1; 310/324, 338, 322

[56] References Cited

U.S. PATENT DOCUMENTS 3,745,384  7/1973  Blanchard ........................... 310/338

FOREIGN PATENT DOCUMENTS 55-60832  5/1980  Japan ..................................... 73/702

Primary Examiner—Donald O. Woodiel
Attorney, Agent, or Firm—Parkhurst & Oliff

[57] ABSTRACT

44A pressure transducer which uses the principle of a variation in the resonance frequency of a membrane when it is subjected to a variable pressure. The transducer comprises a vibrating membrane which is fixed on a support member forming a cavity, and a cover member forming a second cavity. Excitation of the membrane is facilitated since it is made of a piezoelectric material and is provided with electrodes. An object of the invention is to provide a digital output pressure transducer which can be minaturized and which has low power consumption.

14 Claims, 13 Drawing Figures

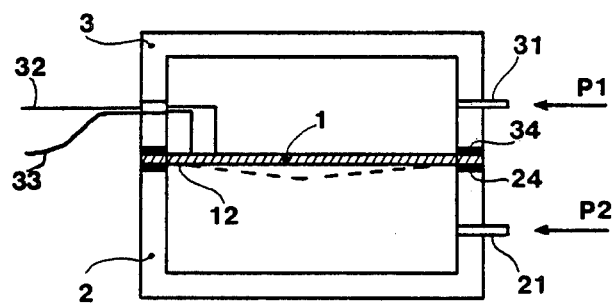
FIG.1.a
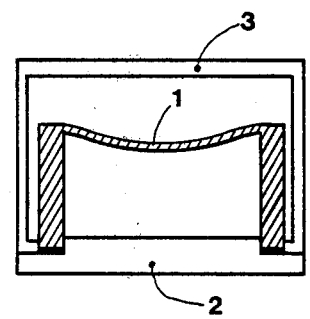
FIG.1.b
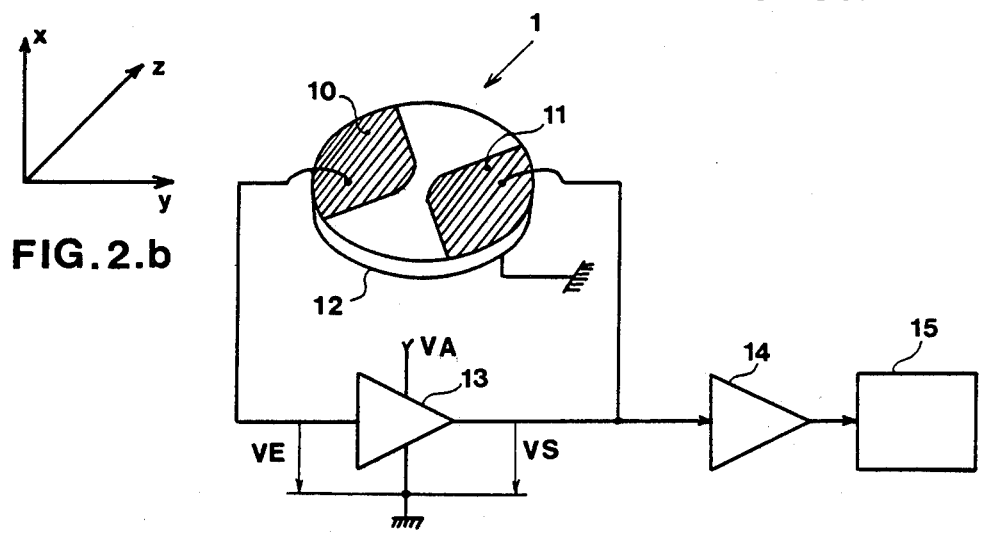
FIG.2.b
FIG.2.a

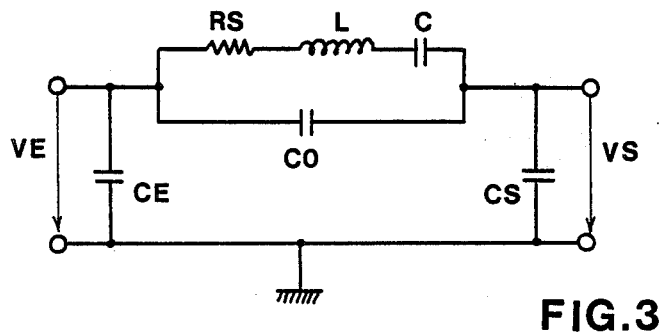
FIG.3
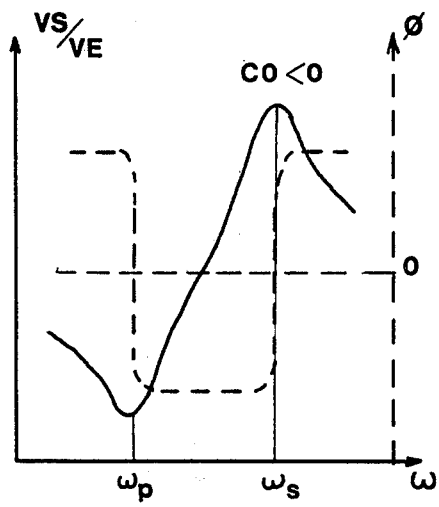
FIG.4.a
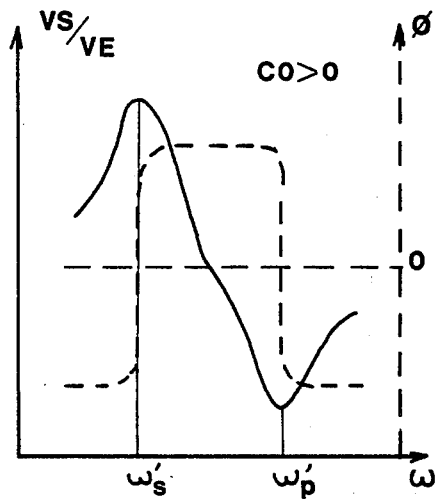
FIG.4.b

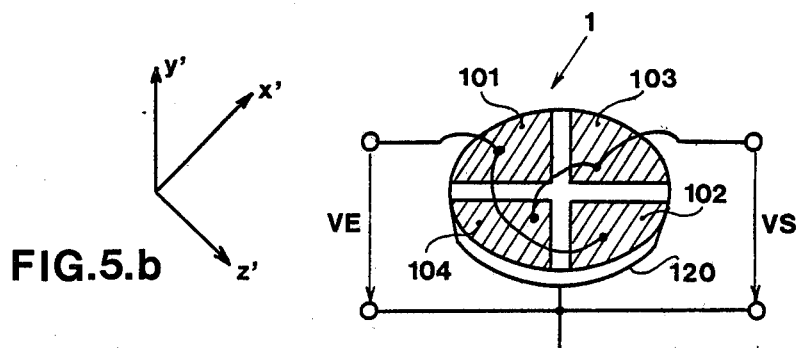
FIG.5.b  FIG.5.a
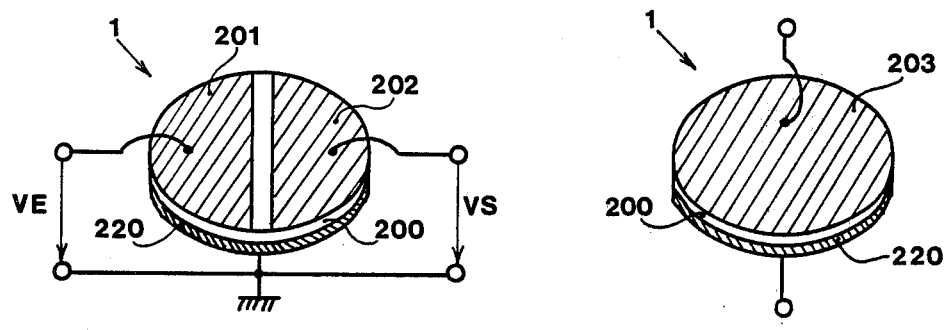
FIG.6.a  FIG.6.b
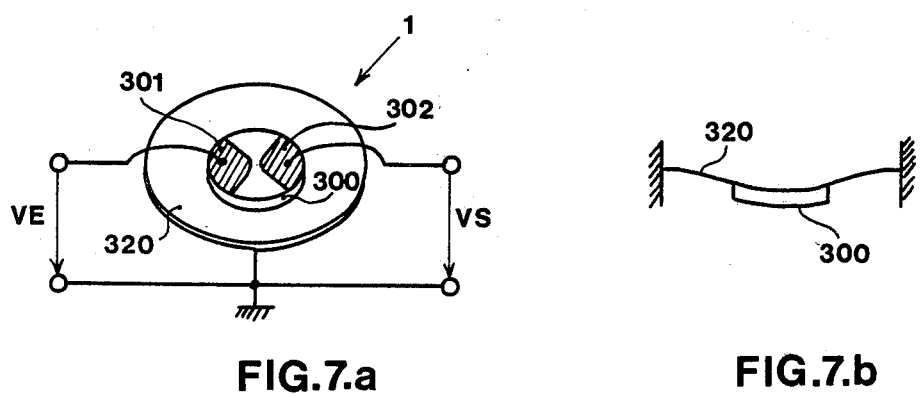
FIG.7.a  FIG.7.b

PRESSURE TRANSDUCER OF THE VIBRATING ELEMENT TYPE

The present invention relates to a pressure transducer of the vibrating element type, for converting a pressure or a pressure difference into an electrical signal, the frequency of which is a measurement of pressure or pressure differences.

Modern data processing methods increasingly require converters for producing output signals which are compatible with entirely digital systems. Moreover, such converters are required to be accurate and stable and if possible to have a very low level of energy consumption. The article by Jerome M. Paros "Precision Digital Pressure Transducer" which appeared in the American Journal I.S.A. Transactions, Volume 12, No. 2, pages 173 to 179 discloses a pressure transducer which complies with those conditions and which uses, as its basic member, a thin plate of quartz which is excited piezoelectrically. In fact, the thin vibrating plate forms a force transducer, the variation in the frequency of which depends on the force applied thereto. Producing a pressure transducer from the above-mentioned force transducer requires mechanical conversion of the pressure into a force, and the delicacy of this operation increases in proportion to an increasing degree of desired accuracy. Such a construction is disclosed in particular in FIG. 3 of the above-mentioned article. A pressure transducer of this type is poorly suited to industrial manufacture because it requires adjustment operations and it is difficult to miniaturize.

A transducer for directly converting a pressure or a pressure difference into a frequency is described in British Pat. No. 1,228,401 which was filed on May 16, 1968 and which is entitled "Pressure Responsive Apparatus". The transducer disclosed in that patent is based on the principle of a vibrating membrane separating two media at different pressures. The resonance frequency of the membrane depends on the pressure difference between the two media. The patent discloses electromagnetic means for exciting the membrane, and such means also serve to determine the resonance frequency and consequently to provide a measurement of the applied pressure difference. Although such a transducer has the advantage of directly converting a pressure into a frequency, it does not fulfil the aim of low level of consumption, and it is difficult to miniaturize.

Thus, the object of the invention is to provide a pressure transducer which uses a vibrating element and which does not suffer from the above-mentioned disadvantages.

In particular, the transducer according to this invention is accurate and responsive, has a very low level of consumption, can be easily miniaturized, and is highly suitable to the requirements of industrial manufacture.

The pressure transducer according to the invention comprises a pressure transducer comprising a vibrating membrane which is fixed on a support member so as to form a first cavity, the vibrating membrane at least partially comprising a piezoelectric material, and means for exciting and maintaining the oscillations of the membrane at its resonance frequency and for producing an electrical signal at the resonance frequency.

The membrane can be formed entirely of piezoelectric material and the support member can be made of the same material as the vibrating membrane.

The invention will be described in more detail by way of example, with reference to the accompanying drawings, in which:

FIG. 1a is a sectional view of a pressure transducer embodying the invention, without the electronic portion thereof, FIG. 1b shows an alternative form of the transducer of FIG. 1a, FIG. 2a is a diagrammatic view of a complete transducer incorporating a membrane made of an X-cut quartz, FIG. 2b shows the axes of cutting of the membrane of FIG. 2a.

FIG. 3 shows an equivalent electrical circuit diagram of a quartz membrane,

FIGS. 4a and 4b are graphs of amplitude and phase in relation to different configurations of electrodes, FIG. 5a shows a GT-cut membrane, FIG. 5b shows the axes of cutting of the membrane of FIG. 5a, FIG. 6a shows another alternative form of membrane produced by depositing a piezoelectric material on a substrate, FIG. 6b shows another configuration of electrodes for a membrane as illustrated in FIG. 6a, FIG. 7a shows another alternative form of membrane produced by securing a pellet of piezoelectric material to a support member by adhesive means, and FIG. 7b is a side view of the membrane of FIG. 7a.

FIG. 1a is a sectional view of a pressure transducer for supplying a signal, the frequency of which is measurement of the difference between the pressures P1 and P2. The transducer comprises a membrane 1 which is preferably but not necessarily circular and which is fixed on a support member 2 forming a cavity, and a cover member 3 which forms a second cavity and which is also fixed to the membrane 1. The support member 2 and the cover member 3 have openings 21 and 31 respectively, by means of which the cavities formed by the support member 2, the membrane 1 and the cover member 3 can be put under different pressures P1 and P2. Seals 24 and 34 secure the support member and the cover member to the membrane. These may be seals using adhesive means or any other suitable means.

According to the invention, the membrane 1 at least partially comprises a piezoelectric material. It may for example be made of quartz and excited by means of metal electrodes deposited on its faces. The electrodes are connected to an oscillator (not shown) by wires 32 and 33. Another electrode is deposited on the lower face 12 of the membrane. It can be brought into electrical contact with the support member 2 if the latter is conducting, and connected to the ground of the oscillator circuit, as will be apparent from the following drawings. The membrane 1 can thus be suitably excited so as to oscillate, outside the normal plane thereof, at its resonance frequency. The resonance frequency is a measurement of the difference between the pressures P1 and P2. It will also be apparent that it is possible to take direct measurements of absolute pressure provided that a vacuum is produced in one of the cavities, for example that formed by the support member 2 and the membrane 1. In such a case the opening 21 will be hermetically sealed once the vacuum has been produced in the cavity. If the transducer is to provide a measurement of atmospheric pressure, the cover member 3 in that case will not be necessary, or may then be made of a material capable of absorbing the acoustic waves produced by the oscillations of the membrane 1. The support member of 2 and/or the cover member 3 will preferably be made of the same material as the membrane in order to reduce the effects of variation in temperature.

FIG. 1b shows a particularly advantageous alternative embodiment of the transducer according to the invention, when it is used for providing a measurement of atmospheric pressure. In this embodiment, the membrane 1 is already in the form of a cavity, with the support member 2 forming the cover thereof. The vibrating portion of the membrane 1 is formed by the reduced-thickness bottom of the cavity. The support member 2 is sealed and fixed to the edges of the membrane, which operation can be carried out under vacuum. A cover member 3 is gripped or held to the edges of the membrane 1, without however preventing atmospheric pressure from communicating with the space between the cover member 3 and the membrane 1. The membrane 1 is made of crystalline quartz and, in its reduced-thickness portion, is provided with electrodes for excitation thereof. However, as will be seen hereinafter, the membrane may also be made of other materials and may have the bottom formed in part by a piezoelectric material which is deposited or applied by adhesive means.

The following figures of drawings show a number of alternative forms of the membrane shown in FIG. 1a. It is apparent however that these alternatives can also be applied to a membrane as shown in FIG. 1b.

FIG. 2a shows an embodiment of a membrane which can serve as a vibrating element of a transducer according to the invention. The membrane 1 is cut from an X-cut quartz plate, as shown in FIG. 2b, in which the axes X, Y and Z respectively represent the electrical axis, the mechanical axis and the optical axis of the crystal. It will be noted that the expression X-cut plate is used to mean a plate which is cut in such a way that the axis X is approximately perpendicular to the plane of the plate. The membrane 1 is metallized over the whole of its lower surface 12, while on its upper surface it is provided with two electrodes 10 and 11. The upper electrodes 10 and 11 are in the shape of angular sectors which are approximately symmetrical with respect to the axis Y of the plate 1. FIG. 2a also shows an amplifier 13 serving as an oscillator, an amplifier 14 for amplifying the output voltage VS of the oscillator, and a frequency measuring means 15 which makes it possible to display the output data of the transducer. The electrode 10 is connected to the input of the amplifier 13, the output of which is connected to the electrode 11 and to the input of the measuring amplifier 14. The metallization on the face 12 of the membrane 1 is connected to the ground of the amplifier 13.

FIG. 3 shows an equivalent electrical circuit diagram of a membrane which is cut from a quartz plate and provided with three electrodes, as in FIG. 2a. Between the input and the output are two parallel branches, one of which is formed by the series connection of a resistor RS, and inductor L and a capacitor C, while the other is formed by an equivalent capacitor CO. The input and the output are both connected to ground by way of respective capacitors CE and CS.

FIGS. 4a and 4b show phase and amplitude graphs for a positive value and a negative value of the equivalent capacitor CO. The amplitude curves are shown in solid lines and they express the variation in the ratio of the output voltage VS to the input voltage VE in dependence on angular frequency W. The ratio VS/VE is at a minimum when W=Wp (parallel resonance) and is at a maximum when W=Ws (series resonance). Parallel resonance takes place when the value of Wp is less than Ws, when CO is negative, and when W'p is higher than W's, when CO is positive. The broken line curves show the variation in phase displacement $\phi$ between the input and output voltages in dependence on angular frequency W. The positive or negative value of the equivalent capacitor CO depends on the membrane used. Thus, for a membrane comprising an X-cut quartz plate such as the membrane shown in FIG. 2a, the equivalent capacitor CO is negative in value whereas for a membrane comprising a GT-cut quartz plate such as the membrane shown in FIG. 5, the equivalent capacitor CO is positive in value.

FIG. 5a shows a membrane 1 which is cut from a GT-cut quartz plate, whle FIG. 5b shows the axes X', Y' and Z' of the crystal. The lower face 120 of the membrane is entirely metallized and forms the electrode connected to ground. Deposited on the upper face are four electrodes 101 to 104, the symmetrical electrodes 101 and 102 or 103 and 104 being connected together so that one pair forms the input terminal and the other the output terminal.

FIGS. 6a and 6b show membranes comprising a metal substrate 220 on which a layer of polarized piezoelectric material 200 is formed for example by vapor deposit. FIG. 6a shows a quadripole configuration with two electrodes 201 and 202 deposited on the layer 200, while FIG. 6b shows a dipole configuration with a single deposited electrode 203. The metal substrate 220 forms the lower electrode.

FIG. 7a shows another embodiment of a membrane according to the invention. The membrane primarily comprises a metal substrate 320, to which a pellet or wafer 300 of piezoelectric material is fixed by adhesive means, the diameter of the pellet 300 being substantially less than that of the substrate 320. The illustrated pellet 300 is made from an X-cut quartz plate and then comprises two electrodes 301 and 302 which are arranged as described with reference to FIG. 2a. It will be apparent however that other cuts and other piezoelectric materials such as zinc oxide, piezoelectric ceramic materials, etc., can also be used.

It is clear that other materials can be used for the substrate 320. However, the substrate will be required to have good mechanical properties (strength, elasticity) and it must be capable of being produced in a sufficiently small thickness. Silicon and silica are mentioned by way of non-limiting examples of materials having the required properties.

FIG. 7b shows a side view of the membrane shown in FIG. 7a. FIG. 7b illustrates that the sensitivity of the transducer of the invention is greater if the membrane is curved beforehand. In fact, the forces generated by applying an a.c. voltage to the electrodes are in a direction parallel to the electrodes. Curvature of the membrane will automatically occur if the pressures applied to respective sides of the membrane are highly different (being the case with a vacuum and atmospheric pressure, for example). On the other hand, if small pressure differences are to be measured, it will be appropriate for the curved configuration of the membrane to be produced before or when the membrane is fixed to its support member. The curved configuration of the membrane can then be produced by means of a mechanical stress applied to the membrane when it is fixed to its support member (FIG. 1a). The curved configuration can also be obtained when producing the membrane (FIGS. 1a and 1b).

The transducer according to the invention which is provided with a suitably adapted electronic arrangement (see FIG. 2a) can easily be used in any system comprising pressure sensing means and a digital processing system. The very low level of energy consumption by the transducer, and the capacity for miniaturization to a high degree, enable the transducer to be incorporated into autonomous battery-powdered or cell-powered systems such as motor vehicles or portable measuring apparatus. It can be used in particular as a digital display barometer or altimeter.

Another advantageous use of the transducer according to the invention is as a gas thermometer. For that purpose, one of the cavities, for example the cavity formed by the membrane 1 and the support member 2, is filled with a gas at a given pressure, and then hermetically sealed. The other cavity can then be at atmospheric pressure, filled with a gas which is different from the first gas which is also at a given pressure or put under vacuum depending on the desired modes of performance. The transducer then produces a signal which is a measurement of the temperature of the medium in which the transducer is disposed, it being assumed that that medium remains at a constant pressure.

What is claimed is:

1. A pressure transducer comprising a vibrating membrane which comprises a reduced-thickness bottom of a cavity in a first member which is fixed on and closed by a support member forming a first cavity, the vibrating membrane at least partially comprising a piezoelectric material and having a curvature therein, and means for exciting the membrane and maintaining oscillations of the membrane at its resonance frequency and for producing an electrical signal at that resonance frequency.

2. A pressure transducer according to claim 1, which the curvature in the membrane is produced by different pressures on the two respective sides of the membrane.

3. A transducer according to claim 1, further comprising a cover member which, with the vibrating membrane, forms a second cavity.

4. A pressure transducer according to claim 3, wherein the cover member comprises means for absorbing acoustic waves produced by oscillation of the vibrating membrane.

5. A pressure transducer according to claim 1, wherein the vibrating membrane is integrally formed by a piezoelectric material and on its faces carries electrodes capable of permitting oscillations of the membrane outside the normal plane thereof.

6. A pressure transducer according to claim 5, wherein the support member is made of the same piezoelectric material as the vibrating membrane.

7. A pressure transducer according to claim 5 or 6, further comprising a cover member which with the vibrating membrane forms a second cavity, wherein the cover member is made of the same piezoelectric material as the vibrating membrane.

8. A pressure transducer according to any of the claims 1 to 4, wherein the membrane is formed by an elastic substrate and by a portion comprising piezoelectric material, carrying at least one electrode, with another electrode being integral with the elastic substrate.

9. A pressure transducer according to claim 8, wherein the portion comprising piezoelectric material is vapor deposited on the elastic substrate.

10. A pressure transducer according to claim 8, wherein the portion comprising piezoelectric material is a pellet of piezoelectric material secured to the elastic substrate.

11. A pressure transducer according to claim 10, wherein the pellet of piezoelectric material is of substantially smaller area than the elastic substrate.

12. A pressure transducer according to any of the claims 1 to 6, wherein the vibrating membrane is fixed on the support member in such a way as normally to have a curvature.

13. A pressure transducer according to any of claims 1 to 6, wherein the membrane per se has a curvature in its normal, unexcited state.

14. A pressure transducer according to any one of claims 1 to 6, wherein the first cavity is filled by a gas at a given pressure and is hermetically closed.

* * * * *